Nov. 26, 1968
C. AKIN
3,413,124
CONTINUOUS FLOW FERMENTATION APPARATUS AND PROCESS
Filed April 5, 1965
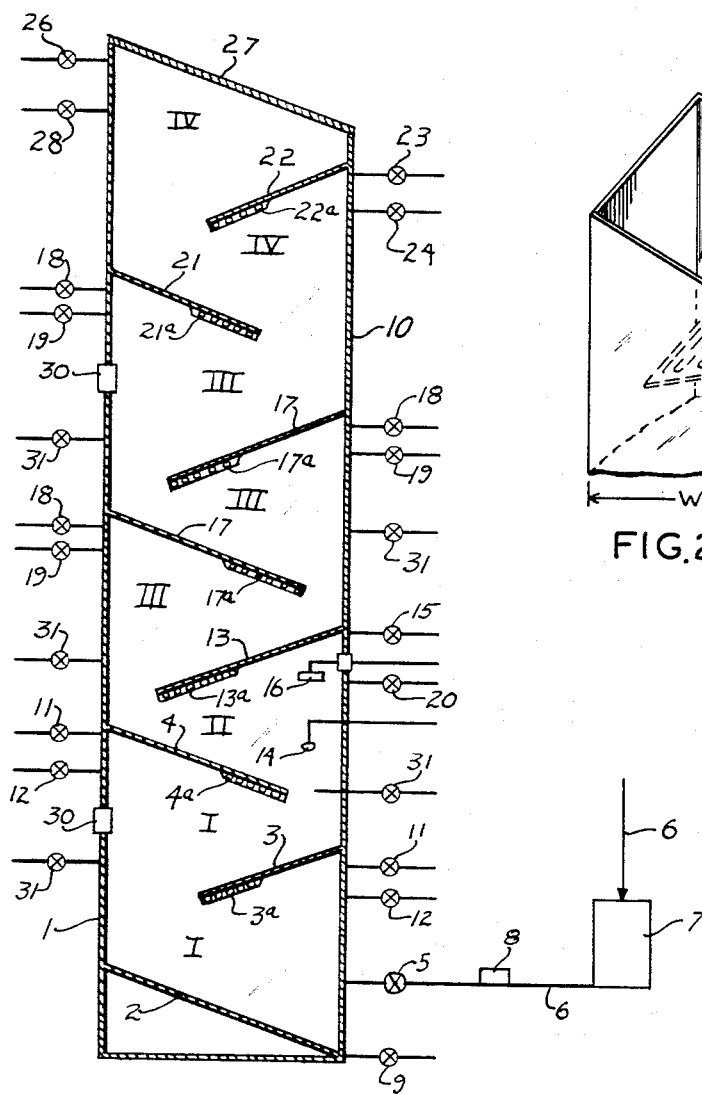
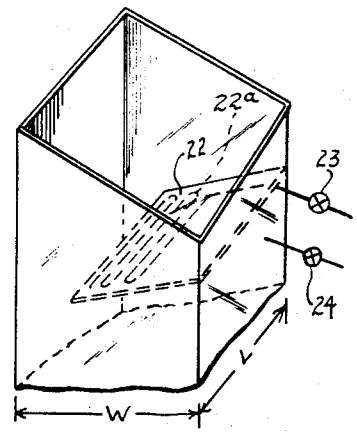
FIG.2
FIG.1
INVENTOR.
CAVIT AKIN
BY Gravely Lieder & Woodruff
ATTORNEYS.

United States Patent Office 3,413,124
Patented Nov. 26, 1968

3,413,124
CONTINUOUS FLOW FERMENTATION
APPARATUS AND PROCESS
Cavit Akin, St. Louis, Mo., assignor to Falstaff Brewing
Corporation, St. Louis, Mo., a corporation of Delaware
Filed Apr. 5, 1965, Ser. No. 445,354
11 Claims. (Cl. 99—31)

ABSTRACT OF THE DISCLOSURE

A continuous flow reaction apparatus for use in connection with continuous reaction methods of treating fermentable materials as well as other non-fermentable materials, the apparatus particularly being directed to an upright reactor casing having a bottom inlet for solid and liquid reactants and a top outlet for the products of the reaction together with a series of unperforated tilted baffles arranged in staggered and spaced relation of varied order and arrangement so as to define a number of process zones in which the reactants move at fast, slow and variable linear speeds. The apparatus is also concerned with means connected to the column for removing desired and undesired products from one or more of the process zones as well as means for adding to the reactants in one or more of the zones.

---

This invention relates to continuous flow reaction apparatus and process, and more particularly to continuous triple phase reaction apparatus and process, such as for fermentation. More specifically the continuous reaction apparatus and process is designed for production of beer and other potable fermented liquids.

The present invention avoids the difficulties and problems of previous continuous fermenters and provides distinct process zones for each step of fermentation. Briefly, the invention appertains to apparatus and process for reaction or preferably fermentation in contiguous process zones. The apparatus is preferably a rectangular tower or column having a pitched bottom and top with alternating slanted baffles or partitions that effectively produce a zig zag flow pattern or path from the bottom to the top of the column. In this manner the fermenter or tower is divided into a trub settling zone, an aeration zone, a fermentation zone and a yeast settling or end fermentation zone which are interconnected, yet gradually functionally separated. Thus, the various stages of processing fermentable liquids, such as beer, are performed by essentially removing dead cells from the input wort moving horizontally in the trub settling zone and removing undesired gases from said zone, while continuously passing the wort and active fermenting agent vertically from the trub settling zone to the aeration zone. The transfer of fermentable wort from the trub settling zone to the aeration zone is at a faster linear rate due to the baffle construction. The aeration zone is provided with an inlet for injecting air or other gaseous component into the fermentable wort. Also, the aeration zone affords outlets to remove undesired components from the aerated fermentable wort, such as excess gases and brandhefe. After relatively slow zig zag flow of the fermentable liquid through the aeration zone, the vertical rate is increased by the baffle design where the fermentable liquid enters the fermentation zone. Slow movement in the fermentation zone permits fermentation at the proper controlled conditions, and again desirable and undesirable gases may be removed in the fermentation zone. Likewise desirable substances may be added directly in this major process zone. From the fermentation zone, the fermented liquid passes into the yeast settling zone at a slow vertical flow rate to permit yeast settling by arrangement of the baffles. Moreover, by virtue of the fast entry rate and the slow exit rate for the fermentation zone, recirculation of yeast is achieved. Conveniently, the apparatus may have heating or cooling coils on the baffles or partitions at the underside thereof to maintain proper temperatures in the various reaction zones. Likewise, the movement of the fermentable liquid from one process zone to another may be controlled by placement of the baffles to increase or decrease the transfer rate between the zones.

It will be understood from the above that the invention provides a continuous fermenter where the fermentation medium passes through all the stages of the usual batch fermentation, gradually moving from one stage to another. The fermentation medium may be transferred from one reaction zone to another reaction zone at a different linear rate than it passes through the particular zone. Moreover, the various inlet and outlets of the apparatus afford good control over the gaseous products and content of the fermentable liquid.

It is therefore an object of the invention to provide a continuous flow reaction apparatus and process in which distinct process zones for various phases of the reaction are provided by arrangement and internal construction of the apparatus.

It is another object of the invention to provide a continuous flow process for fermentable liquids in which each stage of the process is conducted in a functionally distinct zone, and transfer to the next zone is achieved by changing the vertical flow rate.

It is another object of the invention to provide a continuous process for fermenting beer where the fermentation medium passes through all the various stages of batch fermentation in gradually changing process zones.

Another object of the invention is to provide a process for continuous fermentation of beer in a vertical column by passing the fermentation medium through a trub settling zone in which undesired reactants are removed, transferring the fermentable substrate to an aeration zone in which air is injected into the fermentation medium and removed, then passing the fermentation medium into a fermentation zone where substantially all the fermentation process occurs, and then transferring the fermented medium to an end fermentation zone which provides separation of solid fermentation agent from the fermented medium where the completed product is removed.

Another object of the present invention is to provide a continuous fermentation process apparatus having distinct trub settling zone, aeration zone, fermentation zone, and end fermentation zone afforded by a series of baffles which produce a zig zag pattern through the various reaction zones with separate and distinct control of desired and undesired reactants and reaction products.

It is another object of the invention to provide a process of continuous fermentation wherein counter-current flow and recirculation of the fermenting agent is achieved by pitched zig zag flow partitions that effect fast and slow linear flow rates, wherein undesirable reactants are removed prior to the fermentation zone, wherein the final product permits settling of fermentation agent from the end fermentation zone for return to the fermentation zone, and wherein the process has a continuous input of wort and fermentation agent and continuous output of potable fermented liquid.

It is another object of the invention to provide a continuous process reactor having zig zag flow pattern defined by a series of baffles at an acute downward angle which control the flow path and flow rate, and includes control devices for injecting and removing various components involved in continuous processing.

It is another object of the invention to provide continuous fermentation apparatus for production of potable beer comprising an upright rectangular column with flow partitions which provide a slow horizontal flow rate for zone processing and a different vertical transfer rate for movement of the fermentable liquid from one processing zone to another processing zone continuously, while introducing and/or removing desired and/or undesired components appertaining to fermenting potable liquids and removing the potable product.

It is a further object of the invention to provide a continuous process reactor having a zig zag flow pattern defined by a series of baffles covering a significant portion of the cross sectional area of the reactor interior and having controlled members for introducing and removing various components involved in continuous processing.

It is a further object of the invention to provide a continuous fermentation reactor having a rectangular cross section, the interior of the reactor having a series of contiguous process zones separate by a series of staggered baffles extending within the interior, and having control device for injecting and removing various components involved in continuous fermentation.

It is another object of the invention to provide a continuous process reactor having distinct contiguous process zones spaced within the reactor from the bottom to the top, creating a flow path through the various zones having one linear rate and a flow path between contiguous process zones having another linear rate, and the reactor being provided with inlet and outlet control devices.

These and other objects and advantages of the invention will become more apparent from the ensuing description and the claims taken in conjunction with the drawing wherein:

FIG. 1 depicts, partly in schematic, a cross section of the zig zag continuous fermenter appertaining to the invention;

FIG. 2 is a fragmentary perspective illustrative of the fermenter.

Referring now to FIGS. 1 and 2 of the preferred embodiment, the fermenter 10 is preferably a rectangular, prismatic shaped tower. The apparatus has four functional zones, a trub settling zone I, an aeration zone II, a fermentation zone III and a yeast settling or end fermentation zone IV. The zones are provided in the fermenter 10 by a pitched bottom and top, as well as, various baffles or partitions attached at a horizontally depressed angle to various portions of the walls of the column. The trub settling zone I is defined by walls 1, pitched bottom 2 of column 10, and baffles 3 and 4. The baffles 3 and 4 may be provided with heating and cooling coils 3a and 4a, respectively. Also, baffle 3 is shorter than baffle 4. Inlet valve 5 for input of wort mixed with a fermentation agent into the fermenter or column 10. The wort enters from a wort supply line 6 through a fermenting agent back-flow eliminator 7 (a well known trap device) and is fed to the trub settling zone inlet valve 5. Intermediate the back-flow eliminator 7 and trub zone inlet valve 5 is a fermentation agent inlet valve 8. Hence, the composite or fermentable substrate or medium enters the column 10 via input valve 5. The trub zone 1 baffle 3 causes the fermentable medium to flow relatively hroizontally from inlet valve 5 to the opposite side of the zone and then depressed baffle 4 causes the fermentable medium to flow upward and back to the same side of the zone I on top of the baffle plate 3. During this zig zag movement, the substrate flows at a slow linear rate due to short baffle 3, hence trub and dead cells settle and flow down the pitched or sloping bottom 2 of column 10 to a discharge valve 9. The trub settling zone I has a trap area under baffle 3 which is equipped with a gas outlet 11 which may be automatically controlled, as well as brandhefe outlet valve 12. Thus, the gas and brandhefe which collects between the underside of partition or baffle 3 and the sides 1 of the fermenter 10 may be separated from the fermentable medium. In the trub settling zone I, depressed baffle 4 partially separates the trub settling zone I from the aeration zone II. The depressed baffle 4 also forms a collecting region for gases and brandhefe which may be removed by similar valves 11 and 12 as those in connection with baffle 3. The baffle 4 and another baffle 13 with coils 13a form the aeration zone II. A sparger 14 is provided within the aeration zone II and a gas outlet 15 as well as a brandhefe outlet 20 are provided to control the collection of gas and brandhefe in the region confined by baffle 13 in the column 10. The gas outlet 15 may be automatically controlled by float control 16. Baffle 13 partially separates the aeration zone II from the fermentation zone III. Other baffles 17, with heating and cooling coils 17a, in the fermentation zone III aid in maintaining the zig zag flow pattern in the fermentation zone. The trap region of baffles 17 and baffle 21 and the sides of the reactor 10 in fermentation zone III are provided with gas outlets 18, as well as, a brandhefe outlet 19. An additional baffle 21 shorter than the baffles 17 of fermentation zone III and the trub settling partially separates the fermentation zone III from the fermentation agent settling zone IV where end fermentation is achieved. Baffle 21 also forms a trap area for gas and brandhefe and is provided with a gas outlet 18 and brandhefe outlet 19. Since the baffle 21 separating the fermenting agent settling zone IV from the fermentation zone III is short, the fermented medium is transferred at a slow linear rate into the end fermentation zone IV. With the slow linear rate, fermenting agent may settle on top of the baffle 21 and return to the fermenter zone III without resistance from the flow of fermented medium. A baffle 22, with coils 22a, in the settling zone IV provides a zig zag flow of fermenting medium at a relatively slow rate to enhance further settling of the fermentation agent from the potable fermented medium. The baffle 22 has a gas outlet 23 and a brandhefe outlet 24 to remove gas and brandhefe from the trap formed by baffle 22 with the sides of the fermenter 10. Also, gas outlet 26 is provided in the trap under pitched top 27 of reactor 10. The final potable beer or liquid product is withdrawn through product valve 28. Moreover, sight glasses 30 and sampling valves 31 may be provided in various process zones.

The process in relation to the apparatus illustrated in FIGS. 1 and 2 occurs essentially as follows. Initially a supply of the usual beer wort enters line 6 and is passed through the back-flow eliminator 7 into the trub settling zone I. The fermentation agent or usual brewery yeast is injected into the wort inlet line 6 intermediate back-flow eliminator 7 and the trub settling zone I. In the trub settling zone I, the wort and fermentation agent mixture or fermentation medium moves generally horizontal and slightly upward along the bottom 2 of the fermenter 10 with the trub and dead cell settling on the fermenter pitched bottom 2 and slowly moving towards the trub dsicharge valve 9 which is periodically flushed out. As the fermenting mixture fills the reactor and reacts the excess undesired gas in the trub settling zone I is vented by the gas outlets 11. The fermenting agent or yeast and wort moves during continuous processing towards the aeration zone II. At this zone II, the narrow opening baffle 4 causes a fast linear flow of the mixture in a vertical direction. As the fermentation mixture continues to increase filling of the fermenter 10, air or oxygen is injected through an air inlet 14 at a controlled level, and excess air is removed in the trap area. Also, undesirable foam and brandhefe accumulations are removed through an outlet in this zone. The fermentation mixture then enters the anaerobic fermentation zone III at approximately the same linear flow rate as on entering the aeration zone II. The mixture passes through the fermentation zone III in a horizontal and vertical zig zag flow pattern. The linear flow rate through the zone III is slow and yeast tends to settle and move on the pitched surface of the zig zag flow partitions 17 in a direction opposite the flow of the fermented medium. At the tip of the flow partition 4 which separates zones III from aeration zone II, yeast meets fast flowing fermentation medium leaving aeration zone II and resuspends. Hence, this system affords a built-in recirculation arrangement for the yeast. Fermentation gases are collected by the partition traps and removed as required. Consequently, contact of the gases with the final potable fermented liquid product or beer is eliminated. The removal of the gas may be controlled by automatic liquid level probes. Likewise, brandhefe and excessive foam may be removed from the fermentation zone III, and consequently contact of the brandhefe and excessive foam with the final potable fermented liquid product or beer is eliminated. The transfer of the rising liquid mixture out of the fermentation zone is much slower than the linear flow into the fermentation zone and consequently settling of the fermentation agent or yeast from the end fermentation zone IV occurs without the mixture resuspending the fermentation agent. The flow through the end fermentation zone IV is over a sufficient period to achieve the desired end fermentation. The final potable fermented product is removed at the top of zone IV as the mixture at this point is a fully complete potable beer or liquid. It will be understood that various techniques or maintaining the proper process temperatures in the various zones of the continuous fermenter 10 may be used, however temperature control may be readily achieved by the heating and cooling coils on the bottom of the various baffles or partitions of the different process zones.

In a typical fermenter the distance between the flow partitions and the opposite wall is one-third of the width at the trub and yeast settling zone and one-fifth of the width at the fermentation zone. Such an arrangement forces the liquids to have faster linear flow rates at the openings in the fermentation zone. The height of the fermenter is approximately four times the width W. Of course, the number of baffles and the height of a particular zone may be increased or decreased depending on the desired fermentation reactions. For example, the fermentation zone III could be six or eight times the length of any of the other zones. The pitch of the zig zag flow partitions or baffles is 1 inch per 3 inches in the preferred reactor, but could be as little as 1 inch per foot or as much as 1 inch per inch. The apparatus may be made out of typical materials of construction which are well known in the fermentation industry such as, for example, laboratory scale models could be made of acrylic resin for conducting experimental fermentation processes. Also, the commercial process vessels could be stainless steel, glass or plastic lined steel. Of course, in selecting a material of construction for the particular process desired to be performed, the well known effects of a particular material of construction, are avoided for the particular process. Moreover, the apparatus could include numerous sight glasses provided for visual inspection in the various and numerous zones.

The apparatus has been utilized to continuously ferment beer. In the specific apparatus used, column 10 had the following dimensions:

Height from pitched bottom 2 to top 27 was approximately 42 inches.
Width of column 10 was 18 inches.
Length of column was 12 inches.
Baffles 3, 21 and 22 were 11 inches long closing ⅔ of column 10 cross section.
All other baffles were 15 inches long closing ⅘ of column 10 cross section.

In the process of continuously making beer in the specific apparatus, wort containing brewery yeast enters the column 10 at valve 5 at 1.5 to 2 liters per hour feeding rate and the beer was removed at valve 28 at a similar rate. The overall liquid volume was maintained at 150 to 160 liters. Air was injected at sparger 14 at 0.2 liter per minute for one minute every twenty minutes. The fermentation temperature was controlled between 15 to 17° C. Carbon dioxide was removed to prevent gas escape past the baffles. The volume of gas removal was not measured. Substantially all the brandhefe was removed from zone I, zone II, and zone III.

The linear flow rate at the fast flow area in the fermentation zone III was 5 to 6.7 cm. per hr., at the trub and yeast settling zones I and IV was 2.5 to 3.35 cm. per hr., and at the slow flow area was 1.07 to 1.4 cm. per hr.

The final beer product has the characteristics set forth in Table I below.

Table I.—Beer analysis

| Characteristics: | Value |
|---|---|
| Apparent extract | 2.76 |
| Alcohol percent by weight | 3.20 |
| Real extract | 4.21 |
| Original extract (calc.) | 10.5 |
| R. D. fermentation | 59.9 |
| Color SRC | 5.3 |
| pH | 4.40 |
| Total acidity (lactic percent) | 0.15 |
| Protein, percent | 0.35 |
| Red. sugars, percent maltose | 0.98 |
| Dextrins percent (calc.) | 2.61 |
| Iodine reaction | neg. |
| Calcium ppm | 51 |
| Chloride ppm | 302 |
| Copper ppm | 0.14 |
| Iron ppm | <0.10 |
| Sodium ppm | 171 |
| Diacetyl ppm | 0.19 |
| Isohumulones ppm | 17 |
| Hydrogen sulfide ppb | 2 |
| Sulfur dioxide ppm | 1 |

Although the specific fermenter 10 used in disclosing the invention has been considered in the process of forming a fermentable, potable liquid, such as beer, it will be readily appreciated that the apparatus is quite adaptable for process reactions in which liquids, solids and gases in the nature of input ingredients and/or products and output ingredients and/or products, and such reactions may be readily conducted in the apparatus of the invention. For example, the apparatus can be used as a continuous reactor for catalytic hydrogenation of oils. Further, the apparatus may be readily adapted for other processes by providing more or different baffles and inlet and outlet controls to achieve a particular desired reactor.

It will be further appreciated that further minor changes and modifications to the specific apparatus will be readily apparent to those skilled in the art and all such changes and modifications are deemed to be within the scope of the invention as defined in the appended claims.

What is claimed is:

1. A process for continuous fermentation in a unitary, upright fermenter comprising the steps of introducing liquid and solid initial reactants into a bottom reactor zone, allowing said reactants to flow through said bottom zone at a slow linear speed to separate undesired solids in said bottom zone, transferring the reactants to a contiguous initial process zone at a fast linear speed, allowing said initial reactants to move through said initial process zone at a slow linear speed while injecting an additional reactant into said initial process zone and removing minor products from said initial process zone, transferring the initial reactants and additional reactant from said initial process zone at a fast linear speed into a contiguous major process zone for substantial fermentation, allowing said initial reactants and additional reactant to flow at a variable linear speed within said major process zone for a time sufficient to cause said initial reactants and said additional reactant to react to form a final product, removing from said major process zone undesired reactants and products, transferring said final product at a slow linear speed into a contiguous final process zone, allowing the final product to move at a slow linear speed within said final process zone to permit solid reactants moving into said final process zone to return to said major process zone, and withdrawing the final product and other products from said final process zone.

2. The process of claim 1 wherein the initial and additional reactants flow along a vertical zig zag path throughout said reactor.

3. The process of claim 1 wherein gaseous reactant is injected into the initial process zone and undesired reactants are removed from said initial process zone.

4. The process of claim 1 wherein the flow rate within and between various zones is maintained at controlled linear flow rates by positioning baffles in staggered relation throughout said reactor at an acute downward angle.

5. A process for continuous fermentation comprising the steps of introducing liquid and solid reactants into a first process zone, flowing said reactants through said first zone at a varying linear speed along a zig zag path to separate undesired solids in the first zone, transferring the reactants to a second process zone at a speed higher than that in said first zone, flowing said reactants through said second process zone at a slow linear speed while injecting additional reactants into said second zone, transferring the reactants from said second zone at a fast linear speed into a major process zone for substantial fermentation, allowing said reactants to flow at varying linear speeds within said major process zone along a zig zag path for a time sufficient to cause said liquid reactant and said solid reactant to react to form a desired product, flowing said desired product at a slow linear speed into a final process zone, directing the final product at a varying linear speed along a zig zag path for a time sufficient to cause said liquid reactant and said solid reactant to reach to form a desired product, flowing said desired product at a slower linear speed into a final process zone, directing the final product at a varying linear speed along a zig zag path within said final process zone to return solid reactants moving into said final process zone to said major process zone, and withdrawing said desired products during the continuous reaction.

6. A process for continuous fermentation in an upright reactor comprising the steps of introducing wort and yeast mixture into a trub settling zone, allowing said mixture to flow through said settling zone at a slow linear speed to separate trub in the settling zone, transferring the mixture to an initial process zone at a fast linear speed, allowing said mixture to move through said initial process zone at a slow linear speed while injecting a gaseous substance into said initial process zone and removing products from said initial process zone, transferring the mixture from said initial process zone at a fast linear speed into a major process zone for substantial fermentation, allowing said mixture to flow at a variable linear speed within said major process zone for a time sufficient to cause said wort and said yeast to react to form a potable product, removing from said major process zone undesired product, transferring said potable product at a slow linear speed into a final process zone, allowing the potable product to move at a slow linear speed within said final process zone to permit yeast moving into said final process zone to return to said major process zone, and withdrawing the potable product and other products from said final process zone.

7. A process for continuous fermentation in an upright reactor comprising the steps of introducing a fermentable mixture into a settling zone, allowing said reactants to flow along a zig zag path through said settling zone at a slow linear speed to separate undesired solids in said settling zone, flowing the fermentable mixture into an initial process zone at a fast linear speed, allowing said reactants to move in zig zag path through said initial process zone at a variable linear speed while injecting additional reactants into said initial process zone and removing products therefrom, flowing the fermentable mixture from said initial process zone at a fast linear speed into a major process zone, directing said mixture along a zig zag path within said major process zone for a time sufficient to cause said mixture to ferment and form a fermented product.

8. The process of claim 7 including the steps of removing from said major process zone undesired constituents of the mixture, and flowing said product at a slow linear speed into a final product zone and moving it along a zig zag path within said final process zone to settle out solid components of the mixture moving into said final process zone and to return said solid components to said major process zone.

9. Apparatus for continuous fermentation comprising an upright column having a bottom reactant inlet and a top product outlet, and a series of unperforated, tilted baffles positioned within said column to form a series of variable openings on opposed sides of the reactor, said baffles separating the column into distinct yet contiguous settling aeration fermentation and end fermentation zones and said baffles each having such length and pitch as to create fast linear flow into the aeration zone and fermentation zones and slower linear flow within the remaining zones.

10. Apparatus for continuous fermentation processes comprising an upright column structure having a bottom inlet for solid and liquid reactants and a top outlet for the product of reaction, a series of unperforated, tilted baffles arranged in staggered and spaced relation along the length of said column structure, the staggering and spacing between said baffles and the angles of tilt being varied along the length of said column structure to define process zones of fast, slow and variable linear speed of flow of reactants in said column structure, means connected to said column structure to remove desired and undesired products from adjacent certain of said baffles in said zones and other means to add reactants to certain of the process zones.

11. The apparatus of claim 10 wherein the baffles provide a fast flow speed from one contiguous process zone to another contiguous process zone and slow exit speed from said another process zone to allow countercurrent flow of a solid reactant with respect to liquid reactant.

References Cited
UNITED STATES PATENTS

| | | | |
|---|---|---|---|
| 2,450,218 | 9/1948 | Victorero | 195—144 |
| 2,661,270 | 12/1953 | Hudson | 23—288.3 |
| 2,776,935 | 1/1957 | Jahnig et al. | 201—31 |
| 3,083,148 | 3/1963 | Mojonniet | 202—158 |
| 3,173,793 | 3/1965 | Shore et al. | 99—30 |

A. LOUIS MONACELL, *Primary Examiner.*

D. M. NAFF, *Assistant Examiner.*